United States Patent [19]

Muntz

[11] 4,067,857

[45] Jan. 10, 1978

[54] POLYESTER CATALYST SYSTEM COMPRISING AN ANTIMONY-CONTAINING POLYCONDENSATION CATALYST AND AN ETHYLENICALLY UNSATURATED COMPOUND AND PROCESS EMPLOYING SAME

[75] Inventor: Ronald Lee Muntz, Bedford Hills, N.Y.

[73] Assignee: Stauffer Chemical Company, Westport, Conn.

[21] Appl. No.: 688,796

[22] Filed: May 21, 1976

[51] Int. Cl.$^2$ ............................................. C08G 63/14
[52] U.S. Cl. .................................. 260/75 R; 260/446; 560/76; 560/89
[58] Field of Search ................. 260/75 R, 446, 475 P, 260/475 N

[56] References Cited

U.S. PATENT DOCUMENTS

| 3,484,410 | 12/1969 | Lazarus et al. | 260/75 |
| 3,687,860 | 8/1972 | Matsuda et al. | 260/475 P |

OTHER PUBLICATIONS

Polyester, vol. 2, Parkyn et al., (p. 41, 3.7.6).

Primary Examiner—Edward M. Woodberry
Attorney, Agent, or Firm—Ellen P. Trevors; Daniel S. Ortiz

[57] ABSTRACT

A polycondensation catalyst system comprising an antimony-containing polycondensation catalyst and selected ethylenically unsaturated compounds, such as pentaerythritol triacrylate. The ethylenically unsaturated compound stabilizes tne antimony-containing catalyst.

26 Claims, No Drawings

POLYESTER CATALYST SYSTEM COMPRISING AN ANTIMONY-CONTAINING POLYCONDENSATION CATALYST AND AN ETHYLENICALLY UNSATURATED COMPOUND AND PROCESS EMPLOYING SAME

BACKGROUND OF THE INVENTION

This invention relates to a catalyst system for the polycondensation step of polyester production. More particularly, this invention relates to a stable catalyst system for the production of linear polyesters and copolyesters. This invention also relates to a polymerization process employing the catalyst system.

Polymers and copolymers of alkylene terephthalate have found wide spread commercial acceptance. For example, polyesters are used in the manufacture of textile fibers, films, resins, etc.

It is known that polyalkylene terephthalates can be prepared from a suitable alkyl ester of terephthalic acid formed by initially reacting the appropriate alcohol with terephthalic acid. When a methyl ester of terephthalic acid is used as a starting material, it is first reacted with alkylene glycol in the presence of a transesterification catalyst by means of an ester interchange reaction. When terephthalic acid, itself, is used as a starting material, it is subjected to a direct esterification reaction with alkylene glycol in the presence of what is generally called the first stage catalyst additive or ether inhibitor. In either method the resulting reaction product, an ester, is then polycondensed in the presence of a polycondensation catalyst to form polyalkylene terephthalate.

To polymerize a bis(hydroxyalkyl) terephthalate in a reasonable time it is necessary to use a catalyst. Many catalysts have been disclosed for this purpose but it has been found that those giving a rapid production rate also tend to bring about a rapid rate of polymer degradation. Another disadvantage is that many of the known catalysts produce a polymer having a yellowish or gray color. For the manufacture of fibers a color as near white as possible is required and for film making a clear bright polymer is necessary.

It has also long been known in the art that trivalent antimony compounds are excellent polycondensation catalysts. Antimony oxide has been long employed for this use as have various salts and alcohol derivatives such as the alkyl and aryl antimonities, the antimony glycolates, antimony acetates, and antimony oxalate.

However, many of these antimony-containing catalysts produce undesirable side effects, such as a slow rate of reaction, or polymer having a gray color which is undesired in the final terephthalate polymer. It is believed, as discussed in U.S. Pat. No. 3,732,182, that poor rates and gray color formation are caused by a reduction of the antimony catalyst to finely divided metallic antimony. This problem as indicated above has long been known and many attempts have been made to provide a solution.

For example, U.S. Pat. No. 3,484,410 proposes the utilization of trivalent antimony salts of aliphatic hydrocarbon monocarboxylic acids containing at least 12 carbon atoms, while U.S. Pat. No. 3,126,360 discloses the use of various compounds, including benzylic acid and mandelic acid, to be used as a stabilizer or decolorizing agent in the presence of antimony trioxide. U.S. Pat. No. 3,732,182 and U.S. Pat. No. 3,822,239 disclose the utilization of various antimony compounds together with certain alpha-hydroxycarboxylic acids, alpha-beta-dicarboxylic acids, and selected derivatives thereof.

Other antimony-containing compounds have been proposed for uses other than polycondensation catalysts. Thus, U.S. Pat. Nos. 3,407,153; 3,455,995, and 3,471,411 disclose the use of reaction products of alcohols having at least three hydroxyl groups with trivalent antimony compounds as catalysts for the oxyalkylation of polyesters, and as polyurethanes catalysts. Lubricant compositions containing complexes of antimony acid with glycols and polyhydroxybenzenes are taught in U.S. Pat. No. 2,795,551.

Now it has been found in accordance with this invention that selected catalyst systems are efficacious polycondensation catalysts for the preparation of polyalkylene terephthalate.

SUMMARY OF THE INVENTION

The catalyst system of this invention comprises selected ethylenically unsaturated compounds that, when admixed or reacted with antimony-containing polycondensation catalysts, function to stabilize the catalyst. The effect of stabilization is to minimize antimony reduction, thereby effecting increased productivity. Furthermore, many of the systems of this invention result in the production of whiter polymers.

DETAILED DESCRIPTION OF THE INVENTION

More particularly the catalyst system of this invention comprises an antimony-containing polycondensation catalyst; and an ethylenically unsaturated compound having the formula

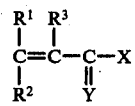

wherein X is hydrogen, $-OR^4$, $-SR^4$, amino, halogen, $-O_2CR^5$, $-NC(O)R^5$ or mercapto; Y is oxygen or sulfur; and $R^1$, $R^2$, $R^3$, $R^4$ and $R^5$ are independently selected hydrogen or substituted or unsubstituted alkyl, cycloalkyl, alkenyl, heterocyclic, aryl, aralkyl or alkaryl, the substituted groups in $R^1$, $R^2$, $R^3$ and $R^5$ being independently selected hydroxyl, mercapto, amino, amido, imino, oxime, halo, aldehydo, alkoxy, alkylthio, keto, sulfinyl, sulfonyl, phosphato, phosphono or phosphino; the substituted groups in $R^4$ being hydroxyl, mercapto, amino, amido, imino, oxime, halo, carboxyl, carboxylate, haloformyl, carboxylic anhydride, aldehydo, alkoxy, alkylthio, keto, sulfinyl, sulfonyl, phosphato, phosphono or phosphino. It should be understood that the R groups in compound I can contain more than one of the named substituents. Preferably, the alkyl groups in compound I have from 1 to 18 carbon atoms, the cycloalkyl groups from 3 to 7 carbon atoms, the alkenyl groups from 2 to 18 carbon atoms, the aryl groups from 6 to 18 carbon atoms, the heterocyclic groups from 3 to 5 ring carbon atoms and an oxygen or sulfur atom, and the aralkyl and alkaryl from 7 to 36 carbon atoms, including 6 to 18 ring carbon atoms.

Many of these ethylenically unsaturated compounds having the formula I are commercially available, while others are readily prepared by known processes.

For example, mixed anhydrides, i.e. those compounds having the formula I where X is —O$_2$CR$^5$, are prepared in accordance with the method described in German Pat. No. 117,267, by reacting a pyridinium salt of the acyl chloride with an appropriate carboxylic acid in accordance with the following general equation where the R groups are as previously defined:

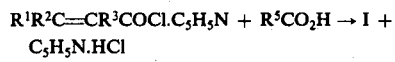

R$^1$R$^2$C=CR$^3$COCl.C$_5$H$_5$N + R$^5$CO$_2$H → I + C$_5$H$_5$N.HCl

Esters, such as compounds having the formula I where X is —OR$^4$ and R$^4$ is as previously described excepting hydrogen, are prepared by reacting the aforementioned acyl chloride with an alcohol having the formula R$^4$OH in the presence of a tertiary amine as described by Sonntag in *Chem. Rev.*, 52,237 (1953), p. 312-324. Esters can also be prepared from the free acid and the aforementioned alcohol in the presence of an acid catalyst as reported in *Org. Syn.* Vol. 3, p. 610, Wiley and Sons, N.Y. (1955). Acid chlorides and bromides, i.e. compounds I where X is halogen are readily prepared from the corresponding free acid and thionyl chloride or thionyl bromide as described in *Org. Syn.*, Vol. 3, p. 169, Wiley and Sons, N. Y. (1955). Substituted acrylic acids, i.e. compounds I were X is —OR$^4$, R$^4$ being hydrogen, are provided by carboxylation of the corresponding acetylene as described by Johnson, *Org. Reactions* 1, p. 210 (1942). They may also be prepared by cleavage of the corresponding ethers as described by Korbrich in *Angew. Chem. Intern. Ed. Engl.* 1, p. 389 (1962), or by pyrolysis of the corresponding hydroxy acids or their esters as described by March, "Advanced Organic Chemistry", p. 752, McGraw Hill, N.Y. (1968).

Exemplary ethylenically unsaturated compounds suitable for use in the practice of this invention include: acrylic acid, methacrylic acid, methacrylamide, α-octadecylacryloyl chloride, β-octadecylacryloyol chloride, α-(o-tolyl) acryloyl bromide, α-(o-octadecylphenyl)-acryloyl chloride, α-cyclopropylthioacrylic acid, α-cycloheptylacrylic acid, ethyl-[α(-1-propen-1-yl) acrylate], octadecyl-[α(-1-propen-1-yl) acrylate], α-phenyl-(2-octadecen-1-yl) acrylate, 2-naphthyl-[α-(2-naphthyl) acrylate], 2-anthryl-[α-(2-anthryl) acrylate], α-benzyl (benzyl acrylate), α-benzyl-(1-hydroxynaphth-2-yl) acrylate, 1-mercaptoanthr-2-yl acrylate, cyclopropylcrotonate, cyclohexyl-β-octadecylclacrylate, 1-propen-1-yl-β-(o-tolyl) acrylate, 1-hexen-1-yl-β(o-octadecylphenyl) acrylate, β-cyclopropyl-[2-(o-carbamoyl-phenyl) ethyl]acrylate, acrylic propionic anhydride, acrylic (p-formylbenzoic) anhydride, 2-ethoxyethyl-acrylic (2-methylthiopropionic) anhydride, (2-oxopropyl) acrylate, acrylic (p-methylsulfonyl benzoic) anhydride, [(3-tosyl)-1-propen-1-yl]acrylate, 2-(p-sulfophenyl) ethyl acrylate, (2-ethylsulfinyl) ethyl acrylate, (diethylphosphonoacetic) acrylic anhydride, (dimethylphosphonomethyl) acrylate, 2-(diethylphosphato) ethyl acrylate, (ethyl phenylphosphino)methyl acrylate, etc.

While any of the aforementioned compounds can be employed in the practice of this invention, preferred embodiments utilize those compounds I where R$^1$, R$^2$ and R$^3$ are independently selected hydrogen, lower alkyl, i.e. alkyl of 1 to 3 carbon atoms, alkenyl having 2 or 3 carbon atoms, heterocyclic having from 3 to 5 carbon atoms and an oxygen atom, or phenyl; Y is oxygen; and X is hydrogen, amino or —OR$^4$ where R$^4$ is hydrogen or unsubstituted or substituted alkyl having from 1 to 6 carbon atoms in the alkyl group. Particularly preferred are those compounds wherein R$^1$, R$^2$ and R$^3$ are independently selected hydrogen or methyl, Y is oxygen and X is —OR$^4$ where R$^4$ is an alkyl having both hydroxy and/or unsaturated ester substituents. For example, acrylate and methacrylate derivatives of glycols and polyols such as glycerol, trimethylol propane and pentaerythritol have been found to be desirable.

The antimony-containing polycondensation catalysts useful in the system of this invention comprise the known antimony compounds suitable for this purpose. Exemplary compounds include the antimony acids and salts thereof, such as antimonous acid, magnesium antimonite, zinc antimonite, calcium antimonite, manganese antimonite, etc.; antimony alkoxides such as trimethyl antimonite, tributyl antimonite, trihexyl antimonite, tridodecyl antimonite, tricyclohexyl antimonite, diethylmethyl antimonite, etc.; antimony carboxylates such as antimony acetate, antimony butyrate, antimony benzoate, antimony toluylate, antimony formate, etc.; antimony halides such as antimony bromide, antimony fluoride, antimony chloride, etcl; antimony sulfide; antimony oxides such as antimony trioxide; and antimony glycoxides such as antimony ethylene glycoxide, antimony butylene glycoxide, etc. The preferred polycondensation catalysts are the antimony acids, antimony alkoxides, antimony acetate and the antimony glycoxides.

In the practice of this invention, the components of the catalyst system are employed in a mole ratio of the ethylenically unsaturated bond in the ethylenically unsaturated compound, to the antimony-containing polycondensation catalyst of 1:1 to 20:1 and preferably in a ratio of 2:1 to 6:1. It should be emphasized that this mole ratio is calculated based on the number of ethylenically unsaturated bonds in the compound.

The catalyst system of this invention can be employed either by first preparing a reaction product where the components are reactive and then employing the reaction product in the polycondensation process, or by adding the components of the system directly to the polycondensation ingredients. If the latter technique is followed, it is believed that some kind of reaction product is formed in situ, because of the high temperature employed in the process.

Where a reaction product is prepared initially, the ethylenically unsaturated compound and the antimony-containing polycondensation catalyst are reacted at temperatures between about 0° C. and 250° C., preferably between about 50° and 150° C. Although the reaction proceeds readily in the absence of a diluent, inert solvents such as hydrocarbons can be used. While the reaction product can be separated from any by-products if desired, it is conveniently used directly in the polycondensation process.

Although the system of this invention is a polycondensation catalyst, it is not necessary to add the system immediately prior to the polycondensation step. Thus, if desired it can be employed directly from the beginning of the process where the glycol terephthalates are prepared.

As previously indicated, the glycol terephthalates, which are employed in the polycondensation process of this invention, are prepared either by direct esterification of terephthalic acid with an appropriate glycol such as ethylene glycol, 1,4-butanediol, 1,4-cyclohexanedimethanol, mixtures thereof, etc., or by the ester-interchange of a lower dialkyl ester of terephthalic acid with the glycol. This preliminary esterification or ester-interchange step is carried out accordingly to known techniques. The resulting glycol terephthalate is then condensed in the presence of the catalyst system of this invention.

Various additives can be employed in this polycondensation step. For example, phosphorus-containing compounds, which are known to inhibit the ester-interchange reaction described above can be employed. Typical phosphorus-containing compounds include triphenyl phosphite, triphenyl phosphine, trihexylphosphate, triphenyl phosphate tributylphosphate, triethylphosphate and mono sodium phosphate. Copolycondensation components such as phthalic acid, succinic acid and the like can also be employed.

The polycondensation process of this invention is carried out at temperatures of 150° to 350° C., preferably in an inert atmosphere. A vacuum is generally applied to remove volatiles and the resulting polymer employed in the manufacture of fibers, resins, film, etc.

While it is not desired to be bound by theory, it is believed that the ethylenically unsaturated bond functions to stabilize the antimony in the catalyst, either by forming a ring compound or by forming a compound which acts as a chelating agent for the antimony catalyst.

The following examples will serve to illustrate the practice of this invention.

EXAMPLE 1 a. Reaction Product Preparation

Pentaerythritol triacrylate (286.0 gms.; 1.00 mole) and tri-n-butyl antimonite (341.0 gms.; 1.00 mole) were mixed in a one-liter, 3-necked flask equipped with a distillation head, magnetic stirrer and heating bath. The mixture was heated at 60°–80° C. and a vacuum applied until no more volatiles were removed. The volatiles weighed 58.5 gms. or 79% of theory, indicating that the reaction product of pentaerythritol triacrylate with tri-n-butyl antimonite had been formed.

The following data was consistent with a formula for the reaction product of

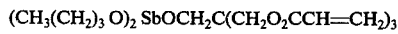
$(CH_3(CH_2)_3 O)_2 SbOCH_2C(CH_2O_2CCH=CH_2)_3$

Anal: Calc'd for Sb 21.7%; Found 21.2%

Infrared Analysis: No hydroxyl absorption indicating reaction of the hydroxyl groups in the pentaerythritol triacrylate; strong carbonyl absorption at 1725 cm$^{-1}$; an olefinic doublet at 1615 and 1630 cm$^{-1}$.

Nuclear Magnetic Resonance: Vinyl protons appear as a complex multiplet at 5.8 to 6.7 ppm with a relative area of 81 units; —CH$_2$O—protons appear as a complex multiplet at 4.5 to 3.9 ppm δ with a relative area of 116 units; aliphatic protons appear as a complex multiplet at 1.9 to 0.8 ppm δ with a relative area of 161 units.

b. Polycondensation

Bis-β-hydroxyethyl terephthalate (33.0 gms.), triphenyl phosphite (0.020 gms.) and 0.49 g of the pentaerythritol triacrylate reaction product prepared in part (a) were mixed in a 50 ml 2-neck flask equipped with a magnetic stirrer, a short-path distillation head and a thermometer. The mixture was heated to about 160° C. and a vacuum applied. The polycondensation was carried out up to a temperature of 280° C. and a pressure of 1 mmHg over a period of 1 hour. Seven to eight grams of ethylene glycol were distilled out of the mixture.

The resultant polymer was poured into a watch glass, cooled and ground to a fine powder in a high speed blender. The powder was placed in a petri dish to form a layer about ¼ inch thick and held in place with a large rubber stopper. The color of the sample was then measured on a Hunterlab Model D25 Color Difference Meter, sold by Hunter Associates Laboratory, McLean, Virginia, employing Hunterlab standard T400 for color difference meter 45° 0° geometry, CIE Illuminant C, ASTM D2244-647 Standard; MgO (ASTM E-259). An average L value of 87.0 for 4 measurements was obtained.

EXAMPLE 2

The polycondensation reaction of example 1 was repeated with the exception that tri-n-butyl antimonite (0.30 gms.; 0.9 milli mole) and pentaerythritol triacrylate (0.27 gms.; 0.9 milli moles) were employed instead of the reaction product of example 1. The resultant polymer, when tested as described in example 1, exhibited an average L value for 2 samples of 86.6.

COMPARATIVE EXAMPLE 1

The polycondensation step of example 1 was repeated with the exception that tri-n-butyl antimonite (0.30 gms.) was employed instead of the reaction product. The color of five samples of the resultant polymer was measured, and an average L value of 81.7 was obtained. This indicates that the use of catalyst without stabilizer results in graying.

COMPARATIVE EXAMPLE 2

Again the polycondensation reaction of example 1 was repeated, employing pentaerythritol (0.12 gms.) and tri-n-butyl antimonite (0.30 gms.) as the catalyst system instead of the reaction product. The resulting polymer had an L value of 81.6 when tested as described in Example 1, indicating that pentaerythritol does not provide the desired color stabilization.

EXAMPLE 3

The polycondensation reaction of Example 1 was repeated with the exception that α-phenylcinnamic acid (0.60 gms.) and tri-n-butyl antimonite (0.30 gms.) were employed as the catalyst system instead of the reaction product of Example 1. The resulting polymer had an L-value of 84.5.

EXAMPLE 4

The polycondensation reaction of Example 1 was repeated again, employing acrylic acid (0.19 gms.; 2.6 milli moles) and tributyl antimonite (0.30 gms.; 0.9 milli moles) as the catalyst system instead of the reaction product of Example 1. While the reaction proceeded satisfactorily, the resultant polymer had an L-value of 80.7, indicating no color improvement for this particular reaction. However, stabilization against thermal decomposition for this system was seen in the screening tests described below, as reported in Examples 15 and 17.

EXAMPLE 5

The polycondensation reaction of Example 1 was repeated again, omitting the reaction product and substituting as the catalyst system trimethylolpropane triacrylate (0.27 gms.; 0.9 milli moles) and tributyl antimonite (0.30 gms.; 0.9 milli moles). The L-value for the resultant polymer was 83.8 as contrasted with an L-value of 78.8 for a polymer prepared from the particular sample of bis-β-hydroxyethylterephthalate used in this Example.

EXAMPLES 6-15

Various systems were screened for thermal stability towards graying in the following manner. The ethylenically unsaturated compound was added to a 25 ml. flask containing 0.01 mole tributyl antimonite dissolved in 15-20 gms. of triethylene glycol. Then the mixture was heated with a mantle while stirring magnetically. The decomposition temperature was that at which a gray color appears; the results for those compounds exhibiting a stabilizing effect are given in Table 1. The Ratio is the mole ratio of ethylenically unsaturated compound to tributyl antimonite; the antimonite in Example 14 was solely from the reaction product employed.

TABLE 1

| Example | Ethylenically Unsaturated Compound | Ratio | TD° C |
| --- | --- | --- | --- |
| Control | None | — | 240-250 |
| 6 | Cinnamic acid | 1:1 | 280 |
| 7 | Cinnamic acid | 3:1 | > 290 |
| 8 | Cinnamaldehyde | 3:1 | 285 |
| 9 | Cinnamamide | 3:1 | > 280 |
| 10 | Methacrylic acid | 3:1 | > 285 |
| 11 | Sorbic acid | 3:1 | > 285 |
| 12 | Hexane diol diacrylate | 1.5:1 | > 280 |
| 13 | Pentaerythritol triacrylate | 1:1 | > 280 |
| 14 | Reaction product of Example 1(a) | | > 280 |
| 15 | Acrylic Acid | 1:1 | > 290 |

EXAMPLES 16-22

The screening test described in Examples 6-15 was followed with the exception that tetraethylene glycol was employed as the solvent instead of triethylene glycol. Table 2 reports the results for those systems exhibiting improved thermal stability.

TABLE 2

| Example | Ethylenically Unsaturated Compound | Ratio | TD° C |
| --- | --- | --- | --- |
| Control | None | — | 240-250 |
| 16 | Reaction product of Example 1(a) | | > 325 |
| 17 | Acrylic acid | 2:1 | 315 |
| 18 | Furylacrylic acid | 3:1 | 290 |
| 19 | Crotonic acid | 3:1 | 305 |
| 20 | Acrylamide | 3:1 | 300 |
| 21 | Ethyl Acrylate | 9:1 | 275 |
| 22 | Trimethylolpropane triacrylate | 1:1 | 305 |

What is claimed is:

1. A polycondensation catalyst system comprising an antimony-containing polycondensation catalyst; and an ethylenically unsaturated compound having the formula

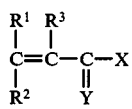

wherein X is hydrogen, $-OR^4$, $-SR^4$, amino, halogen, $-O_2CR^5$, $-NC(O)R^5$ or mercapto; Y is oxygen or sulfur; and $R^1$, $R^2$, $R^3$, $R^4$ and $R^5$ are independently selected hydrogen or substituted or unsubstituted alkyl, cycloalkyl, alkenyl, hetercyclic, aryl, aralkyl or alkaryl, the substituted groups in $R^1$, $R^2$, $R^3$ and $R^5$ being independently selected hydroxyl, mercapto, amino, amido, imino, oxime, halogen, aldehydo, alkoxy, alkylthio, keto, sulfinyl, sulfonyl, phosphato, phosphono or phosphino; the substituted groups in $R^4$ being hydroxyl, mercapto, amino, amido, imino, oxime, halogen, carboxyl, carboxylate, haloformyl, carboxylic anhydride, aldehydo, alkoxy, alkylthio, keto, sulfinyl, sulfonyl, phosphato, phosphono or phosphino; the mole ratio of the ethylenically unsaturated bond in said ethylenically unsaturated compound to said antimony-containing polycondensation catalysts being 1:1 to 20:1.

2. The catalyst system of claim 1 wherein said alkyl has from 1 to 18 carbon atoms, said cycloalkyl has from 3 to 7 carbon atoms, said alkenyl has from 2 to 18 carbon atoms, said heterocyclic has from 3 to 5 carbon atoms, said aryl has from 6 to 18 ring carbon atoms, and said aralkyl and alkaryl have from 7 to 36 carbon atoms.

3. The catalyst system of claim 2 wherein Y is oxygen; $R^1$, $R^2$ and $R^3$ are independently selected hydrogen or methyl, alkyl having from 1 to 3 carbon atoms, alkenyl having from 2 to 3 carbon atoms, heterocyclic having from 3 to 5 carbon atoms and an oxygen atom, or phenyl; and X is hydrogen, amino or $-OR^4$ where $R^4$ is hydrogen or unsubstituted or substituted alkyl having from 1 to 6 carbon atoms in the alkyl group.

4. The catalyst system of claim 3 wherein $R^1$, $R^2$ and $R^3$ are independently selected hydrogen or methyl.

5. The catalyst system of claim 4 wherein said ethylenically unsaturated compound is acrylic acid or methacrylic acid.

6. The catalyst system of claim 4 wherein said ethylenically unsaturated compound is furylacrylic acid.

7. The catalyst system of claim 4 wherein said ethylenically unsaturated compound is a glycol acrylate, a glycol methacrylate, a polyol acrylate or a polyol methacrylate.

8. The catalyst system of claim 7 wherein said ethylenically unsaturated compound is pentaerythritol triacrylate.

9. The catalyst system of claim 7 wherein said ethylenically unsaturated compound is trimethylolpropane triacrylate.

10. The catalyst system of claim 7 wherein said ethylenically unsaturated compound is hexane diol diacrylate.

11. The catalyst system of claim 3 comprising the product made by reacting said antimony-containing polycondensation catalyst and said ethylenically unsaturated compound at between about 0° and 250° C.

12. The catalyst system of claim 11 comprising the reaction product of said antimony-containing polycondensation catalyst and a glycol acrylate, a glycol methacrylate, a polyol acrylate or a polyol methacrylate.

13. The catalyst system of claim 12 comprising the reaction product of pentaerythritol triacrylate and an antimony alkoxide.

14. A process for preparing polyesters comprising condensing glycol terephthalate at a temperature of 150° to 350° C. in the presence of a catalyst system which comprises an antimony-containing polycondensation catalyst and an ethylenically unsaturated compound having the formula

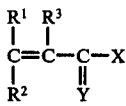

wherein X is hydrogen, —OR⁴,—SR⁴, amino, halogen, —O₂CR⁵,—NC(O)R⁵ or mercapto; Y is oxygen or sulfur; and R¹, R², R³, R⁴ and R⁵ are independently selected hydrogen or substituted or unsubstituted alkyl, cycloalkyl, alkenyl, heterocyclic, aryl, aralkyl or alkaryl, the substituted groups in R¹, R², R³ and R⁵ being independently selected hydroxyl, mercapto, amino, amido, imino, oximo, halogen, aldehydo, alkoxy, alkylthio, keto, sulfinyl, sulfonyl, phosphato, phosphono or phosphino; the substituted groups in R⁴ being hydroxyl, mercapto, amino, amido, imino, oximo, halogen, carboxyl, carboxylate, haloformyl, carboxylic anhydride, aldehydo, alkoxy, alkylthio, keto, sulfinyl, sulfonyl, phosphato, phosphono or phosphino; the mole ratio of the ethylenically unsaturated bond in said ethylenically unsaturated compound to said antimony-containing polycondensation catalyst being 1:1 to 20:1.

15. The process of claim 14 wherein, in said ethylenically unsaturated compound, said alkyl has from 1 to 18 carbon atoms, said alkenyl has from 2 to 18 carbon atoms, said heterocyclic has from 3 to 5 carbon atoms, said aryl has from 6 to 18 ring carbon atoms, and said aralkyl and alkaryl have from 7 to 36 carbon atoms.

16. The process of claim 15 wherein, in said ethylenically unsaturated compound, Y is oxygen; R¹, R² and R³ are independently selected hydrogen or methyl, alkyl having from 1 to 3 carbon atoms, alkenyl having from 2 to 3 carbon atoms, heterocyclic having from 3 to 5 carbon atoms, and an oxygen atom, or phenyl; and X is hydrogen, amino or —OR⁴ where R⁴ is hydrogen or unsubstituted or substituted alkyl having from 1 to 6 carbon atoms in the alkyl group.

17. The process of claim 16 wherein, R¹, R² and R³ in said ethylenically unsaturated compound are independently selected hydrogen or methyl.

18. The process of claim 17 wherein said ethylenically unsaturated compound is a glycol acrylate, a glycol methacrylate, a polyol acrylate or a polyol methacrylate.

19. The process of claim 18 comprising condensing glycol terephthalate in the presence of an antimony-containing polycondensation catalyst and pentaerythritol triacrylate.

20. The process of claim 18 comprising condensing glycol terephthalate in the presence of an antimony-containing polycondensation catalyst and trimethylolpropane triacrylate.

21. The process of claim 18 comprising condensing glycol terephthalate in the presence of an antimony-containing polycondensation catalyst and hexane diol diacrylate.

22. The process of claim 17 comprising condensing glycol terephthalate in the presence of an antimony-containing polycondensation catalyst and acrylic acid or methacrylic acid.

23. The process of claim 17 comprising condensing glycol terephthalate in the presence of an antimony-containing polycondensation catalyst and furylacrylic acid.

24. The process of claim 16 comprising condensing glycol terephthalate in the presence of a catalyst system prepared by reacting an antimony-containing polycondensation catalyst with said ethylenically unsaturated compound at between about 0° and 250° C.

25. The process of claim 24 comprising condensing glycol terephthalate in the presence of a catalyst system prepared by reacting an antimony-containing polycondensation catalyst with a glycol acrylate, a glycol methacrylate, a polyol acrylate or a polyol methacrylate.

26. The process of claim 25 wherein said polycondensation catalyst is an antimony alkoxide.

* * * * *